Jan. 13, 1970  F. M. RAY, SR  3,489,045
TUBE PUNCHING DEVICE
Filed Feb. 9, 1968
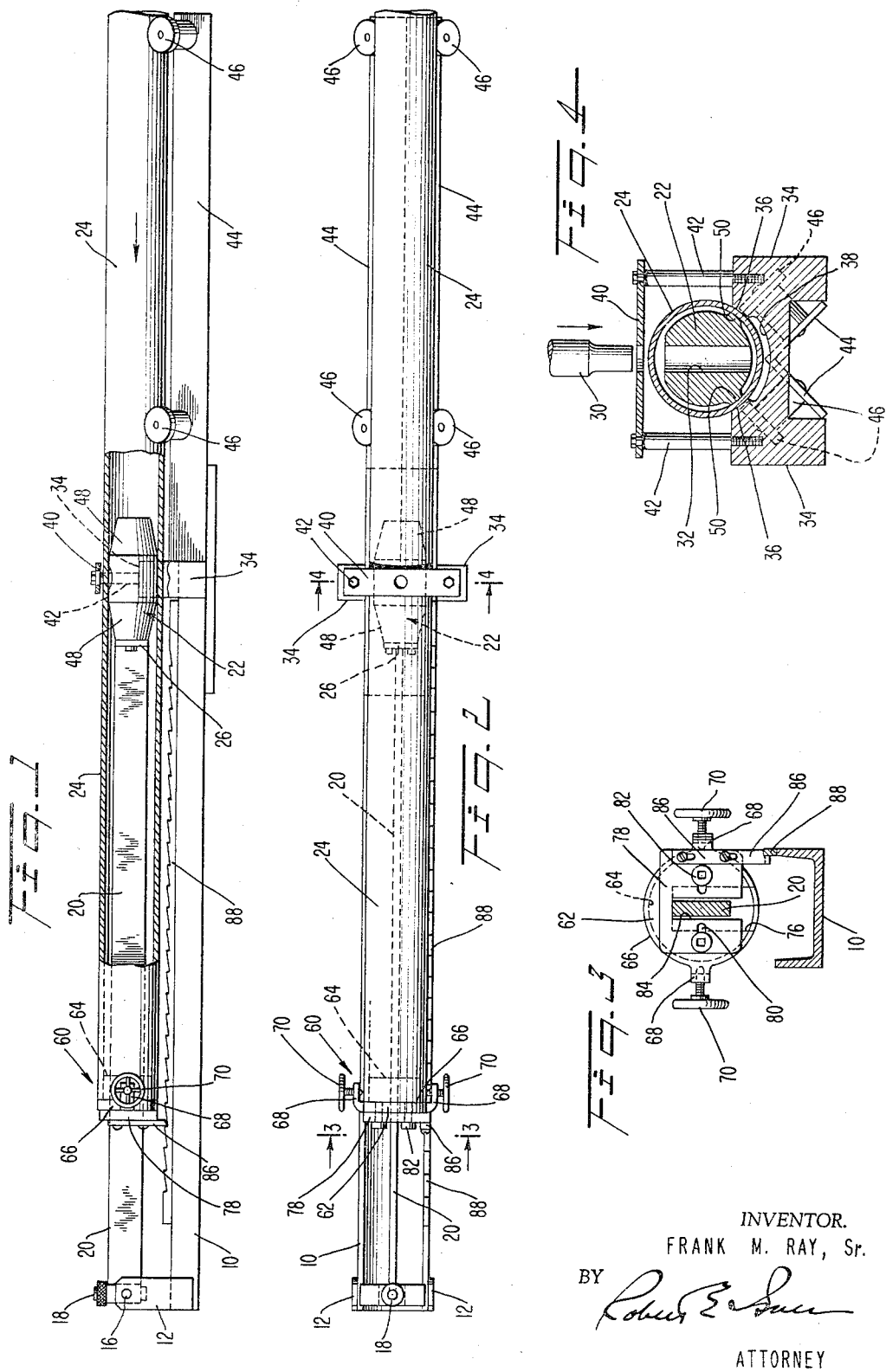
INVENTOR.
FRANK M. RAY, Sr.
BY
ATTORNEY United States Patent Office 3,489,045
Patented Jan. 13, 1970

3,489,045
TUBE PUNCHING DEVICE
Frank M. Ray, Sr., Rockaway, N.J., assignor to Slick Industrial Company, Summit, N.J., a corporation of Delaware
Filed Feb. 9, 1968, Ser. No. 704,357
Int. Cl. B23d 21/14
U.S. Cl. 83—188                              5 Claims

ABSTRACT OF THE DISCLOSURE

Apparatus for selectively positioning predetermined locations intermediate the ends of an elongate tube relative to a mating tool and die assembly in which a tube clamping and locating assembly is adapted to engage the end of a tube disposed around a die supporting mandrel member and to accommodate a predetermined degree of displacement of the tube end relative to the tool and die assembly without detrimental displacement of the portion of the tube disposed in operative relation with the mating tool and die.

---

This invention relates to metal deforming assemblies and particularly to an improved apparatus for selectively positioning predetermined locations intermediate the ends of an elongated tube relative to a mating tool and die assembly.

In the general type of positioning device herein of interest, a portion of the tube to be punched or otherwise deformed is adapted to be disposed around a die bearing mandrel member that is maintained in operative alignment with an auxiliary displaceable tool member such as a punch for introducing a hole in the tube wall. Effective operability of such type of assembly essentially requires the utilization of tubes that are straight or at least of minimal curvature since conventional structures for positioning the tubes relative to the mandrel cannot accommodate tubes that are bent or curved beyond minimal limits. Such tubes that are bent or curved beyond the aforesaid minimal amounts either cannot be placed on the mandrel at all or cannot be fixedly supported thereon in the necessary correct position for the tool to properly cooperate with the interiorly disposed mating die at the desired location for introducing a clean and sharply defined hole therein.

As embodied in the illustrated device, the invention is particularly adapted to accommodate tubes that are curved or bent to degrees markedly beyond that now accommodatable in conventional apparatus. To the above end, the invention includes, in its broad aspects, a die member mounted at the end of an elongate supporting mandrel member that is terminally mounted at its remote end at one end of an elongate supporting frame and an associated selectively positionable tube clamping and locating assembly mounted on said supporting member in such manner as to adaptably accommodate the terminal end of a tube in secure relationship independent of curvature therein and to locate the portion thereof to be subjected to the action of the tool in operative positioned relationship with the internally disposed mandrel supported die member and an associated externally disposed tool member. In its more narrow aspects, the invention includes an associated dog and rack assembly for presetting desired location of the tube relative to the mandrel and tube deforming elements for efficiently permitting a series of operations to be sequentially performed at the selected locations along the length of the tube.

The object of this invention is the provision of an improved apparatus for selectively positioning preselected locations intermediate the ends of an elongate tube relative to a mating tool and die assembly.

Further objects and advantages of the invention will become apparent from the following portions of this specification and from the appended drawings which, in accordance with the mandates of the patent statutes illustrate a presently preferred embodiment of a device incorporating the principles of this invention.

Referring to the drawings:

FIGURE 1 is a side elevational view, partly in section, of a presently preferred construction for apparatus for die punching tube walls that incorporates the principles of this invention;

FIGURE 2 is a plan view of the device illustrated in FIGURE 1;

FIGURE 3 is a vertical section taken on the line 3—3 of FIGURE 2; and

FIGURE 4 is a vertical section taken on the line 4—4 of FIGURE 2.

As best illustrated in FIGS. 1 and 2, there is provided an elongated base section 10, conveniently formed of an upwardly open U-shaped channel beam or the like. Extending upwardly from one terminal end thereof are a pair of spaced upright standards 12 having an inverted U-shaped strap member 14 disposed therebetween and pivotally mounted on a horizontally disposed pivot pin 16. Dependently mounted on the strap member 14 and on a vertically disposed pivot pin 18 is a terminal end of an elongated rectangular mandrel member 20. The above-described mounting constitutes, in effect, a universal type of joint which permits the body portion of the mandrel member 20 to be moved up and down as may be required as well as a limited degree of movement from left to right. The other and free end of the elongated mandrel member 20 terminates in a transversely disposed die mounting plate 26 having a die member 22 mounted thereon adapted to be within a surrounding tube 24.

The die member 22 is disposed in predetermined and fixed relationship with an associated vertically reciprocable punch member 30 and is preferably shaped to provide a pair of tapered end portions 48 disposed on either side of a mid-section of a diameter that is slightly smaller than the size of the tube being accommodated. Positioning of the die member 22 within the tube 24 is effected by means of a pair of extending pads or projections 50. As best illustrated in FIG. 4, the die member 22 also includes a vertically disposed bore 32 adapted to accommodate the dependent end of the punch member 30 and to receive the portion of the wall of the tube 24 that is removed by the punch displacement.

Associated with the punch member 30 and underlying the die member 22 is a support block 34 shaped to provide a tube receiving channel having a pair of angularly disposed tube supporting projections 36 disposed on either side of a shallow recess 28, and located so as to be disposed in complemental facing engagement with the pads 50 on the die 22. Mounted above the support block 34 and disposed in spaced relationship therewith by a pair of vertical support columns 42 is a horizontally disposed stripper plate 40. Extending outwardly from the underside of the support block 34 is a tube supporting assembly 44 suitably formed of an inverted piece of angle iron and having a plurality of rollers 46 mounted thereon so as to properly position and support the extending ends of tube 24 relative to the tool assembly and yet freely permit displacement of said tube when desired.

As is apparent from the sectional view of FIGURE 4, the pads 50 on the die member 22 are adapted to bear against the interior wall of the tube 24 and thereby support and position the die member 22 in predetermined position relative to the tube cross-section with the punch receiving bore 32 in the die member being disposed in operative alignment with the punch member 30 when a tube 24 is seated on the support block 34 as indicated.

Disposed intermediate the ends of the elongate mandrel member 20 and selectively displaceable therealong is a tube clamping and locating assembly, generally designated 60. Such assembly includes a tube engaging jig member formed of a planar base segment 62 of generally circular configuration and of a diameter appreciably larger than the external diameters of tubes to be accommodated and an extending cylindrically shaped body portion 64 of markedly decreased diameter so as to be containable within the tubes to be accommodated. The differences in diameters thus defines an extending intermediate shoulder portion 66 adapted to be disposed in abutting engagement with the end of a tube member 24 disposed in surrounding relation with the extending body portion 64. In order to fixedly locate the tube end so disposed, the planar base segment 62 is provided with a pair of extending clamping wings or lugs 68 disposed essentially parallel to and in spaced relation from the side walls of the extending body portion 64. Threadedly mounted on the wings 68 are manually manipulatible clamping screws 70 which serve, when tightened, to clampingly engage the outer surfaces of a tube element 24 and to secure the same relative to the tube engaging jig member as above described. As best shown in FIG. 3, the tube engaging jig member is provided with an enlarged axially disposed rectangular channel 76 which permits the disposition of said unit in overlying relation on the rectangular mandrel 20 in such manner as to provide for an appreciable degree of play in effectively all directions therebetween. As will be apparent, the degree of play thus afforded permits the securement of the unit to a tube end surrounding the mandrel essentially independent of the concentricity or location of the tube end vis-a-vis the mandrel as would be occasioned by an undesired degree of curvature or bend therein. In order to more securely locate the tube engaging jig member relative to the mandrel member 20 after accommodation of a tube of any predetermined curvature an auxiliary guide plate 78 mounted on the exposed surface of the planar base segment 62 is provided. As illustrated, the guide plate 78 includes a rectangular channel 84 only slightly larger than the mandrel 20 and, in order to permit displacement thereof relative to the body portion, it is provided with elongate transversely disposed mounting slots connectable to the jig member by means of exposed bolt members 82 passing therethrough.

Mounted on the exposed surface of the guide plate 78 is a vertically displaceable latching bar or dog 86 which is positioned so as to provide for operative engagement thereof with interchangeable auxiliary rack members 88 mounted on one of the walls of the U-shaped base section 10.

In operation of the subject device the tube clamping and locating assembly is prelocated relative to the punch 30 and a tube 24 to be subjected to the desired deformation is slipped over the die member 22. While supported by its engagement with support block 34 and rollers 46, the tube 24 is longitudinally displaced so as to locate the desired area to be punched relative to the tool elements and to place its end into surrounding engagement with the extending body portion 64 of the tube clamping and locating assembly 60. With the tube end so positioned and disposed in facing engagement with the intermediate shoulder 66, the clamping screws 70 may be manually tightened so as to secure said tube end in fixed engagement with the clamping assembly 60. As will be apparent, the degree of curvature in the tube will determine the location of the clamping assembly 60 relative to the mandrel 20 within the degree of play afforded by the sizing of the oversized channel 76. With the tube clamping and locating assembly 60 so positioned, the auxiliary guide plate 78 which, as illustrated is provided with a rectangular channel 84 of markedly less width than that of the channel 76, is tightened to thereby effectively locate the clamping assembly 60 in relatively fixed position relative to the mandrel member 20. With the tube end so positioned and clamped the exact portion of the tube to be punched is then located so as to be in accurate alignment with the punch 30 and concurrently therewith fine positioning and locking of the selected rack member 88 is effected so as to facilitate subsequent tube displacement for the sequential introduction of additional holes therein. The displacement of the punch 30 is then initiated to introduce a hole in the portion of the tube then disposed in operative relation with the punch and die assembly.

As pointed out above, the tube 24 may be subsequently longitudinally displaced relative to the mandrel assembly, with readjustment of the guide plate 78 if required, so as to permit introduction of additional holes into the tube at selected locations therealong, as determined by the inter-engagement between the latching bar or dog 86 and the selected rack member 88.

As will now be apparent to those skilled in this art, the hereinabove described structure provides for the accommodation of tubes that have a marked degree of curvature or bend therein in a rapid and simple manner by mere adjustment of the tube locating and clamping assembly components and thereby affords an appreciable increase in utility and convenience in effecting deformation of elongate tubes by mating tool and die assemblies of the type described.

The device herein illustrated and described constitutes a presently preferred embodiment of the invention and it should be understood that modifications, alterations and variations may be made in the specific structure thereof and in the modes of operation shown and described herein without departing from the spirit and scope of the invention defined by the following claims:

1. Apparatus for positioning elongate tubes relative to a deforming tool comprising
    a base member,
    an elongate mandrel member pivotally mounted at one end of said base member and disposed in overlying relation therewith,
    a die member mounted at the other end of said mandrel member,
    a tube support member mounted on said base member in underlying relation with said die member,
    a tube end clamping jig assembly displaceably mounted on said mandrel member intermediate said die member and the pivotally mounted end, including
    a channeled body portion loosely mounted on said mandrel adapted to be clamped to a tube end encircling said mandrel and positionable relative to said mandrel in accordance with the degree of concentricity of said tube end relative to said mandrel, and
    a plate portion relatively closely engaging said mandrel and securable to said body portion subsequent to the positioning of the latter as effected by clamping engagement thereof with a tube end whereby the portion of the tube disposed in operative relation to said die member is securely positioned with respect thereto.

2. Apparatus as set forth in claim 1 including rack means mounted on said base member and cooperating dog means mounted on said plate portion of said clamping jig assembly for selectively locating said tube relative to said die member for sequential deformation operations thereon.

3. Apparatus as set forth in claim 2 wherein said channeled body portion comprises a plate section of a transverse extent appreciably greater than the external diameter of the tubes to be deformed and an extending cylindrical body section of a diameter sized to be contained within the tubes to be deformed.

4. Apparatus as set forth in claim 3 including clamping means mounted on said plate section for compressively engaging the end portion of a tube disposed around said extending body section.

5. Apparatus as set forth in claim 1 including means to support the portions of a tube being deformed disposed remote from said tube end clamping jig assembly.

References Cited

UNITED STATES PATENTS

| | | | |
|---|---|---|---|
| 877,855 | 1/1908 | Murray | 83—195 X |
| 2,412,930 | 12/1946 | Walklet | 83—195 X |
| 3,022,811 | 2/1962 | Huet | 83—188 X |
| 3,111,873 | 11/1963 | Lind | 83—195 X |

WILLIAM S. LAWSON, Primary Examiner

U.S. Cl. X.R.

83—195